US012629669B2

(12) United States Patent
Devers

(10) Patent No.: US 12,629,669 B2
(45) Date of Patent: May 19, 2026

(54) METHOD FOR REJUVENATING A CATALYST FROM A HYDROPROCESSING AND/OR HYDROCRACKING PROCESS

(71) Applicant: IFP ENERGIES NOUVELLES, Rueil Malmaison Cedex (FR)

(72) Inventor: Elodie Devers, Rueil Malmaison Cedex (FR)

(73) Assignee: IFP ENERGIES NOUVELLES, Rueil Malmaison Cedex (FR)

( * ) Notice: Subject to any disclaimer, the term of this patent is extended or adjusted under 35 U.S.C. 154(b) by 533 days.

(21) Appl. No.: 18/266,661

(22) PCT Filed: Dec. 2, 2021

(86) PCT No.: PCT/EP2021/083868
§ 371 (c)(1),
(2) Date: Jun. 12, 2023

(87) PCT Pub. No.: WO2022/128486
PCT Pub. Date: Jun. 23, 2022

(65) Prior Publication Data
US 2024/0042423 A1 Feb. 8, 2024

(30) Foreign Application Priority Data
Dec. 15, 2020 (FR) ..................................... 2013244

(51) Int. Cl.
| *B01J 38/48* | (2006.01) |
| *B01J 21/04* | (2006.01) |
| *B01J 27/19* | (2006.01) |
| *B01J 27/28* | (2006.01) |
| *B01J 37/20* | (2006.01) |
| *B01J 37/28* | (2006.01) |
| *B01J 38/02* | (2006.01) |
| *B01J 38/12* | (2006.01) |
| *B01J 38/62* | (2006.01) |
| *C10G 47/20* | (2006.01) |

(52) U.S. Cl.
CPC ............. *B01J 38/485* (2013.01); *B01J 21/04* (2013.01); *B01J 27/19* (2013.01); *B01J 27/285* (2013.01); *B01J 37/20* (2013.01); *B01J 37/28* (2013.01); *B01J 38/02* (2013.01); *B01J 38/12* (2013.01); *B01J 38/62* (2013.01); *C10G 47/20* (2013.01)

(58) Field of Classification Search
CPC .......... B01J 21/04; B01J 23/85; B01J 23/882; B01J 23/92; B01J 23/94; B01J 27/19; B01J 27/285; B01J 37/0203; B01J 37/0213; B01J 37/20; B01J 37/28; B01J 38/02; B01J 38/12; B01J 38/485; B01J 38/62; C10G 45/08; C10G 47/12; C10G 47/20
See application file for complete search history.

(56) References Cited

U.S. PATENT DOCUMENTS

| 7,820,579 B2 | 10/2010 | Ginestra et al. | |
| 7,906,447 B2 | 3/2011 | McCarthy et al. | |
| 7,956,000 B2 | 6/2011 | Jansen et al. | |
| 11,351,529 B2 | 6/2022 | Guichard et al. | |
| 2009/0261019 A1* | 10/2009 | McCarthy ................ B01J 38/48 |
| | | | 208/134 |
| 2010/0326889 A1 | 12/2010 | Ginestra et al. | |
| 2017/0036202 A1 | 2/2017 | Vincent et al. | |
| 2017/0232432 A9 | 8/2017 | Vincent et al. | |
| 2022/0040680 A1 | 2/2022 | Devers et al. | |
| 2022/0062874 A1 | 3/2022 | Devers | |

FOREIGN PATENT DOCUMENTS

| FR | 3089824 A1 | 6/2020 |
| FR | 3089826 A1 | 6/2020 |
| JP | 2014050838 A | 3/2014 |

OTHER PUBLICATIONS

International search report PCT/EP2021/083868 dated Mar. 1, 2022 (pp. 1-3).

* cited by examiner

*Primary Examiner* — Brian A Mccaig
(74) *Attorney, Agent, or Firm* — Millen, White, Zelano & Branigan, P.C.; Brion P. Heaney

(57) ABSTRACT

The invention relates to a process for rejuvenating an at least partially spent hydrotreating and/or hydrocracking catalyst, said catalyst comprising a group VIII metal, a group VIB metal and an oxide support, said process comprising the following steps:
  a) the catalyst is regenerated,
  b) said regenerated catalyst is then brought into contact with an impregnation solution consisting of a mixture of water, at least one precursor of a group VIB metal, at least one precursor of a group VIII metal and at least one organic compound, the amount of organic compound introduced into the regenerated catalyst being optimized with respect to the metals already present in the regenerated catalyst and with respect to the amount of metals introduced via the impregnation solution,
  c) a drying step is then carried out without subsequently calcining it.

14 Claims, No Drawings

METHOD FOR REJUVENATING A CATALYST FROM A HYDROPROCESSING AND/OR HYDROCRACKING PROCESS

FIELD OF THE INVENTION

The invention relates to a process for the rejuvenation of a hydrotreating and/or hydrocracking catalyst and to the use of the rejuvenated catalyst in the field of hydrotreating and/or hydrocracking.

STATE OF THE ART

Usually, a catalyst for the hydrotreating of hydrocarbon cuts has the aim of removing the sulfur-based or nitrogen-based compounds contained in them in order, for example, to make a petroleum product meet the required specifications (sulfur content, aromatics content, and the like) for a given application (motor vehicle fuel, gasoline or gas oil, domestic fuel oil, jet fuel).

Conventional hydrotreating catalysts generally comprise an oxide support and an active phase based on metals from Groups VIB and VIII in their oxide forms and also on phosphorus. The preparation of these catalysts generally comprises a step of impregnation of the metals and the phosphorus on the support, followed by drying and a calcination making it possible to obtain the active phase in their oxide forms. Before their use in a hydrotreating and/or hydrocracking reaction, these catalysts are generally subjected to a sulfidation in order to form the active species.

The addition of an organic compound to the hydrotreating catalysts in order to improve their activity has been recommended by a person skilled in the art, in particular for catalysts which have been prepared by impregnation followed by drying without subsequent calcination. These catalysts are often referred to as "additive-impregnated dried catalysts".

During its operation in a hydrotreating and/or hydrocracking process, the catalyst becomes deactivated by accumulation of coke and/or sulfur-based compounds or compounds containing other heteroelements at the surface of the catalyst. Beyond a certain period, its replacement is thus necessary.

In order to combat these disadvantages, the regeneration (gentle calcination) of catalysts for the hydrotreating of middle distillates or of spent residues is an economically and ecologically advantageous process because it makes it possible to use these catalysts again in industrial units rather than to landfill them or to recycle them (recovery of the metals). However, the regenerated catalysts are generally less active than the starting catalysts.

In order to overcome the shortfall in hydrodesulfurizing activity of the regenerated catalyst, it is possible to apply an additional "rejuvenation" treatment. The rejuvenation process consists in reimpregnating the regenerated catalyst with a solution containing organic or inorganic additives in the presence or absence of metal precursors. These "rejuvenation" processes are well known to a person skilled in the art in the field of middle distillates. Many patents, such as, for example, U.S. Pat. Nos. 7,956,000, 7,820,579, FR 2 972 648, US2017/036202 or also CN102463127, thus provide different methods for carrying out the rejuvenation of the catalysts for the hydrotreating of middle distillates.

The document U.S. Pat. No. 7,956,000 describes a rejuvenation process which brings a catalyst comprising a group VIB metal oxide and a group VIII metal oxide into contact with an acid and an organic additive, of which the boiling point is between 80° C. and 500° C. and a solubility in water is at least 5 grams per liter (20° C., atmospheric pressure), optionally followed by a drying operation under conditions such that at least 50% of the additive is maintained in the catalyst. The hydrotreating catalyst can be a fresh hydrotreating catalyst or a spent hydrotreating catalyst which has been regenerated.

The document U.S. Pat. No. 7,906,447 describes a process of rejuvenation by contacting a catalyst comprising a group VIB metal oxide and a group VIII metal oxide with a solution comprising a group VIB metal, a group VIII metal and an organic complexing additive. After impregnation, the catalyst is heat-treated via a partial calcination above 200° C. in order to decompose the organic complexing additive to produce an organic residue. Thus, the rejuvenated catalyst contains at least 5% by weight of carbon in the form of organic residue, relative to the weight of the rejuvenated and partially calcined catalyst.

The document JP 5 892 989 B describes a process for rejuvenating a catalyst, including a regeneration step, followed by a step of rejuvenation via introduction of molybdenum, nickel and a chelating agent, and a drying and/or calcination step. The amount of molybdenum introduced during the rejuvenation step, expressed as $MoO_3$, is between 0.5% and 3% by weight relative to the weight of the catalyst, and that of the nickel, expressed as NiO, is between 0.2% and 3% by weight relative to the weight of the catalyst. As regards the amount of chelating agent introduced, this is between 0.1% and 10% by weight relative to the weight of the catalyst. The introduced Ni/Mo ratio is between 0.8 and 2, the CA/(Ni+Mo) ratio is between 0.6 and 1.4. At the end of the rejuvenation process, the catalyst undergoes a calcination.

The document FR 3 089 826 describes a process for rejuvenating a catalyst, including a regeneration step, followed by a step of rejuvenation via introduction of phosphoric acid and an organic acid having each acidity constant pKa greater than 1.5, and a step of drying at a temperature of less than 200° C. without subsequent calcination. Optionally, metals may also be added to the impregnation solution.

The objective of the present invention is thus to provide a process for the rejuvenation of a hydrotreating and/or hydrocracking catalyst making it possible to regain a sufficient catalytic activity.

SUBJECTS OF THE INVENTION

The invention relates to a process for rejuvenating an at least partially spent hydrotreating and/or hydrocracking catalyst, said at least partially spent catalyst comprising at least one group VIB metal, at least one group VIII metal, an oxide support, and optionally phosphorus, the at least partially spent catalyst having a content of group VIB metal of between 1% and 40% by weight, expressed as oxide of said group VIB metal, relative to the weight of the catalyst, and a content of group VIII metal of between 1% and 10% by weight, expressed as oxide of said group VIII metal, relative to the weight of the catalyst, said process comprising the following steps:

a) the at least partially spent catalyst is regenerated in a stream of oxygen-containing gas at a temperature of between 300° C. and 550° C., so as to obtain a regenerated catalyst, b) said regenerated catalyst is then brought into contact with an impregnation solution consisting of a mixture of water, at least one precursor of a group VIB metal, at least one precursor of a group VIII metal and at least one organic compound, the content of organic compound introduced into the impregnation solution being between 6% and 21% by weight of organic compound relative to the weight of the regenerated catalyst, the content of group VIB metal introduced into the impregnation solution being between 1% and 5% by weight, expressed as group VIB metal oxide, relative to the weight of the regenerated catalyst, the content of group VIII metal introduced into the impregnation solution being between 0.2% and 1% by weight, expressed as group VIII metal oxide, relative to the weight of the regenerated catalyst, the molar ratio of the organic compound to the sum of the group VIB and group VIII metals present in said solution being between 0.9 and 11 mol/mol, c) a drying step is then carried out at a temperature of less than 200° C., without subsequently calcining it, so as to obtain a rejuvenated catalyst.

Specifically, the applicant has observed that the implementation of this rejuvenation process made it possible to obtain a hydrotreating and/or hydrocracking catalyst with improved catalytic performance qualities compared with the regenerated catalyst.

Typically, by virtue of the improvement in the activity, the temperature necessary to achieve a desired sulfur or nitrogen content (for example 10 ppm of sulfur in the case of a gas oil feedstock, in ULSD or Ultra Low Sulfur Diesel mode) is close to that of the fresh catalyst.

Without being bound to any theory, it seems that when the amount of organic compound introduced into the regenerated catalyst is optimized firstly with respect to the metals already present in the regenerated catalyst, and secondly with respect to the amount of group VIB and group VIII metals introduced via the impregnation solution, all coupled with simple drying without subsequent calcination, this makes it possible to observe an increase in the catalytic activity which is not foreseeable.

The rejuvenation in the presence of a precise amount of organic compound with respect to the metals already present in the catalyst and with respect to the metals introduced via the impregnation solution appears to enable a good dissolution and redistribution of the metal phases, in order to recover a dispersion that is close to the fresh catalyst, this being done by adding only a very small amount of metals of the active phase.

The increase in the catalytic activity is more particularly visible when, in addition to the optimization of the amount of organic compound added, the group VIII metal to group VIB metal molar ratio in the impregnation solution of step b) is between 0.1 and 0.5 mol/mol, and is preferably identical to the ratio of group VIII metal to group VIB metal that are already present on the regenerated catalyst.

Thus, according to an alternative form, the group VIII metal to group VIB metal molar ratio in the impregnation solution of step b) is between 0.1 and 0.5 mol/mol.

According to an alternative form, the group VIII metal to group VIB metal molar ratio of the regenerated catalyst is between 0.1 and 0.5 mol/mol.

According to an alternative form, the group VIII metal to group VIB metal molar ratio in the impregnation solution of step b) is identical to the group VIII metal to group VIB metal molar ratio of the regenerated catalyst.

According to an alternative form, the content of organic compound introduced into the impregnation solution is between 6% and 16% by weight of organic compound relative to the weight of the regenerated catalyst.

According to an alternative form, the molar ratio of the organic compound to the sum of the group VIB and group VIII metals present in said solution is between 1 and 4 mol/mol.

According to an alternative form, the organic compound is chosen from an organic compound containing oxygen and/or nitrogen and/or sulfur.

According to this alternative form, the organic compound is chosen from a compound comprising one or more chemical functions chosen from a carboxyl, alcohol, thiol, thioether, sulfone, sulfoxide, ether, aldehyde, ketone, ester, carbonate, amine, nitrile, imide, oxime, urea and amide function, or a compound including a furan ring or also a sugar.

According to this alternative form, the organic compound is chosen from γ-valerolactone, 2-acetylbutyrolactone, triethylene glycol, diethylene glycol, ethylene glycol, ethylenediaminetetraacetic acid (EDTA), maleic acid, malonic acid, citric acid, acetic acid, oxalic acid, malic acid, gluconic acid, glucose, fructose, sucrose, sorbitol, xylitol, γ-ketovaleric acid, a di($C_1$-$C_4$ alkyl) succinate and more particularly dimethyl succinate, dimethylformamide, 1-methyl-2-pyrrolidinone, propylene carbonate, 2-methoxyethyl 3-oxobutanoate, bicine, tricine, 2-furaldehyde (also known under the name furfural), 5-hydroxymethylfurfural, 2-acetylfuran, 5-methyl-2-furaldehyde, ascorbic acid, butyl lactate, ethyl lactate, butyl butyryllactate, ethyl 3-hydroxybutanoate, ethyl 3-ethoxypropanoate, 2-ethoxyethyl acetate, 2-butoxyethyl acetate, 2-hydroxyethyl acrylate, 1-vinyl-2-pyrrolidinone, 1,3-dimethyl-2-imidazolidinone, 1,5-pentanediol, 1-(2-hydroxyethyl)-2-pyrrolidinone, 1-(2-hydroxyethyl)-2,5-pyrrolidinedione, 5-methyl-2(3H)-furanone, 1-methyl-2-piperidinone, 4-aminobutanoic acid, butyl glycolate, ethyl 2-mercaptopropanoate, ethyl 4-oxopentanoate, diethyl maleate, dimethyl maleate, dimethyl fumarate, diethyl fumarate, dimethyl adipate and dimethyl 3-oxoglutarate.

According to an alternative form, the at least partially spent catalyst contains phosphorus, the total content of phosphorus being between 0.1% and 20% by weight, expressed as $P_2O_5$, relative to the weight of the catalyst.

According to an alternative form, the oxide support is chosen from aluminas, silica, silica-aluminas or also titanium or magnesium oxides, used alone or as a mixture with alumina or silica-alumina.

According to an alternative form, the regeneration step is preceded by a deoiling step which comprises bringing an at least partially spent catalyst resulting from a hydrotreating and/or hydrocracking process into contact with a stream of inert gas at a temperature of between 300° C. and 400° C.

According to an alternative form, the rejuvenated catalyst is subjected to a sulfidation step after step c).

The invention also relates to the use of the rejuvenated catalyst prepared according to the process of the invention in a process for the hydrotreating and/or hydrocracking of hydrocarbon cuts.

Hydrotreating is understood to mean reactions encompassing in particular hydrodesulfurization (HDS), hydrodenitrogenation (HDN) and hydrogenation of aromatics (HDA).

Definitions

In the text hereinbelow, the groups of chemical elements are given according to the CAS classification (CRC Handbook of Chemistry and Physics, published by CRC Press, editor-in-chief D. R. Lide, 81$^{st}$ edition, 2000-2001). For example, group VIII according to the CAS classification corresponds to the metals of columns 8, 9 and 10 according to the new IUPAC classification.

The contents of group VIII metals, group VIB metals and phosphorus are measured by X-ray fluorescence.

The contents of group VIB metal, of group VIII metal and of phosphorus in the fresh, at least partially spent, regenerated or rejuvenated catalyst are expressed as oxides after correction for the loss on ignition of the catalyst sample in a muffle furnace at 550° C. for two hours. The loss on ignition is due to the loss of moisture, carbon, sulfur and/or other contaminants. It is determined according to ASTM D7348.

The content of carbon and sulfur in the at least partially spent or regenerated catalyst is measured by elemental analysis according to the standard ASTM D5373.

DESCRIPTION OF THE INVENTION

The rejuvenated catalyst obtained via the process according to the invention results from an at least partially spent catalyst, itself resulting from a fresh catalyst, used in a process for the hydrotreating and/or hydrocracking of hydrocarbon cuts for a certain period of time and which exhibits a substantially lower activity than the fresh catalyst, which necessitates its replacement.

Fresh Catalyst

The fresh catalyst used in a process for the hydrotreating and/or hydrocracking of hydrocarbon cuts is known to a person skilled in the art. It comprises at least one group VIII metal, at least one group VIB metal, an oxide support and optionally phosphorus and/or an organic compound as described below.

The preparation of the fresh catalyst is known and generally comprises a step of impregnation of the group VIII and group VIB metals and optionally of phosphorus and/or of the organic compound on the oxide support, followed by a drying operation, then by an optional calcination making it possible to obtain the active phase in their oxide forms. Before its use in a process for the hydrotreating and/or hydrocracking of hydrocarbon cuts, the fresh catalyst is generally subjected to a sulfidation in order to form the active species as described below.

According to an alternative form of the invention, which is preferred when an organic compound is present, the fresh catalyst has not undergone calcination during its preparation, that is to say that the impregnated catalytic precursor has not been subjected to a step of heat treatment at a temperature of greater than 200° C. under an inert atmosphere or under an oxygen-containing atmosphere, in the presence or absence of water. In this case, the catalytic precursor is simply dried.

According to another alternative form of the invention, the fresh catalyst has undergone a calcination step during its preparation, that is to say that the impregnated catalytic precursor has been subjected to a step of heat treatment at a temperature of between 200° C. and 1000° C. and preferably between 250° C. and 750° C., for a period of time typically of between 15 minutes and 10 hours, under an inert atmosphere or under an oxygen-containing atmosphere, in the presence or absence of water.

The contents of group VIB metal, of group VIII metal and optionally of phosphorus in the fresh catalyst are substantially identical to the contents of the at least partially spent catalyst described below, disregarding the coke and other impurities in the at least partially spent catalyst.

The fresh catalyst may additionally comprise at least one organic compound containing oxygen and/or nitrogen and/or sulfur before sulfidation. Such additives are known. In particular, the fresh catalyst may comprise at least one of the organic compounds described below (step b). The content of organic compound(s) containing oxygen and/or nitrogen and/or sulfur on the fresh catalyst is between 1% and 30% by weight, preferably between 1.5% and 25% by weight and more preferably between 2% and 20% by weight, relative to the weight of the fresh catalyst.

At Least Partially Spent Catalyst

During the process for the hydrotreating and/or hydrocracking of hydrocarbon cuts, coke and sulfur as well as other contaminants resulting from the feedstock, such as silicon, arsenic and metals, are formed and/or deposited on the catalyst and transform the fresh catalyst into an at least partially spent catalyst.

An at least partially spent catalyst is understood to mean a catalyst which exits from a hydrotreating process carried out under the conditions as described below and which has not undergone a heat treatment under a gas containing air or oxygen at a temperature of greater than 200° C. (also often known as regeneration step). It may have undergone a deoiling.

The at least partially spent catalyst is composed of the oxide support and of the active phase formed of at least one group VIB metal and of at least one group VIII metal and optionally of phosphorus from the fresh catalyst, as well as coke, sulfur and optionally other contaminants resulting from the feedstock, such as silicon, arsenic and metals. When the fresh catalyst comprised an organic compound before its use, the latter is generally no longer present in the at least partially spent catalyst.

The active phase of the at least partially spent catalyst comprises at least one group VIB metal and at least one group VIII metal. The group VIB metal present in the active phase of the catalyst is preferentially chosen from molybdenum and tungsten. The group VIII metal present in the active phase of the catalyst is preferentially chosen from cobalt, nickel and the mixture of these two elements. The active phase of the catalyst is preferably chosen from the group formed by the combination of the elements nickel-molybdenum, cobalt-molybdenum, nickel-tungsten, nickel-molybdenum-tungsten and nickel-cobalt-molybdenum, and very preferably the active phase consists of cobalt and molybdenum, of nickel and molybdenum, of nickel and tungsten or of a nickel-molybdenum-tungsten combination. Particularly preferably, the active phase consists of cobalt and molybdenum.

The content of group VIII metal is between 1% and 10% by weight, preferably between 1.5% and 9% by weight, and more preferably between 2% and 8% by weight, expressed as group VIII metal oxide, relative to the weight of the at least partially spent catalyst. When the metal is cobalt or nickel, the metal content is expressed as CoO and NiO respectively.

The content of group VIB metal is between 1% and 40% by weight, preferably between 2% and 35% by weight, and more preferably between 10% and 30% by weight, and particularly preferably between more than 20% and 30% by weight, expressed as group VIB metal oxide, relative to the weight of the at least partially spent catalyst. When the metal is molybdenum or tungsten, the metal content is expressed as $MoO_3$ and $WO_3$ respectively.

The group VIII metal to group VIB metal molar ratio of the at least partially spent catalyst is generally between 0.1 and 0.5 mol/mol, preferably between 0.15 and 0.48 mol/mol, and particularly preferably between 0.2 and 0.45 mol/mol.

Optionally, the at least partially spent catalyst can additionally exhibit a phosphorus content generally of between 0.1% and 20% by weight, expressed as $P_2O_5$, relative to the weight of the catalyst, preferably between 0.2% and 15% by weight, very preferably between 0.3% and 11% by weight. For example, the phosphorus present in the catalyst is combined with the group VIB metal and optionally also with the group VIII metal in the form of heteropolyanions.

Furthermore, the phosphorus/(group VIB metal) molar ratio is generally between 0.08 and 1, preferably between 0.1 and 0.9 and very preferably between 0.15 and 0.8.

The oxide support of the at least partially spent catalyst is usually a porous solid chosen from the group consisting of: aluminas, silica, silica-aluminas or also titanium or magnesium oxides, used alone or as a mixture with alumina or silica-alumina. Preferably, the oxide support is a support based on alumina or on silica or on silica-alumina.

When the oxide support is based on alumina, it contains more than 50% by weight of alumina, relative to the weight of the support, and, in general, it contains only alumina or silica-alumina as defined below.

Preferably, the oxide support comprises alumina, and preferably extruded alumina. Preferably, the alumina is gamma alumina.

The alumina support in the fresh catalyst advantageously exhibits a total pore volume of between 0.1 and 1.5 $cm^3 \cdot g^{-1}$, preferably between 0.4 and 1.1 $cm^3 \cdot g^{-1}$. The total pore volume is measured by mercury porosimetry according to the standard ASTM D4284 with a wetting angle of 140°, as described in the work by Rouquerol F., Rouquerol J. and Singh K., "Adsorption by Powders & Porous Solids: Principle, Methodology and Applications", Academic Press, 1999, for example by means of an Autopore III™ model machine of the Micromeritics™ brand.

The specific surface area of the alumina support in the fresh catalyst is advantageously between 5 and 400 $m^2 \cdot g^{-1}$, preferably between 100 and 350 $m^2 \cdot g^{-1}$, more preferably between 200 and 350 $m^2 \cdot g^{-1}$. The specific surface area is determined in the present invention by the BET method according to the standard ASTM D3663, which method is described in the same work mentioned above.

In another preferred case, the oxide support is a silica-alumina containing at least 50% by weight of alumina, relative to the weight of the support. The silica content in the support is at most 50% by weight, relative to the weight of the support, usually less than or equal to 45% by weight, preferably less than or equal to 40%.

Sources of silicon are well known to a person skilled in the art. Mention may be made, by way of example, of silicic acid, silica in the powder form or in the colloidal form (silica sol), or tetraethyl orthosilicate $Si(OEt)_4$.

When the support for said catalyst is based on silica, it contains more than 50% by weight of silica, relative to the weight of the support, and, generally, it contains only silica.

According to a particularly preferred alternative form, the oxide support consists of alumina, silica or silica-alumina.

The oxide support can also advantageously additionally contain from 0.1% to 80% by weight, preferably from 0.1% to 50% by weight, of zeolite, relative to the weight of the support. In this case, any source of zeolite and any associated preparation method known to a person skilled in the art can be incorporated. Preferably, the zeolite is chosen from the group FAU, BEA, ISV, IWR, IWW, MEI, UWY and preferably the zeolite is chosen from the group FAU and BEA, such as zeolite Y and/or beta zeolite, and particularly preferably such as USY and/or beta zeolite.

The support is advantageously provided in the form of beads, extrudates, pellets or irregular and nonspherical agglomerates, the specific shape of which can result from a crushing step.

Preferably, the at least partially spent catalyst is characterized by a specific surface area of between 5 and 350 $m^2/g$, preferably of between 10 and 300 $m^2/g$, preferably of between 40 and 280 $m^2/g$, very preferably of between 50 and 250 $m^2/g$. The specific surface area is determined in the present invention by the BET method according to the standard ASTM D3663, as described in the work by Rouquerol F., Rouquerol J. and Singh K., *Adsorption by Powders & Porous Solids: Principle, Methodology and Applications*, Academic Press, 1999, for example by means of an Autopore III™ model machine of the Micromeritics™ brand.

The pore volume of the at least partially spent catalyst is generally between 0.1 $cm^3/g$ and 1.5 $cm^3/g$, preferably between 0.3 $cm^3/g$ and 1.1 $cm^3/g$. The total pore volume is measured by mercury porosimetry according to the standard ASTM D4284 with a wetting angle of 140°, as described in the same work.

The at least partially spent catalyst may also contain coke, sulfur and optionally other contaminants resulting from the feedstock such as silicon, arsenic and metals.

It should be noted that the term "coke" in the present application denotes a substance based on hydrocarbons which is deposited on the surface of the at least partially spent hydrotreating catalyst during its use, which is highly cyclized and condensed and which has an appearance similar to graphite.

The at least partially spent catalyst may in particular contain coke at a content generally of greater than or equal to 2% by weight, expressed as carbon element, preferably of between 2% and 25% by weight, and more preferably still of between 4% and 16% by weight, relative to the weight of the at least partially spent catalyst.

The at least partially spent catalyst can contain sulfur in a content generally of between 1% and 15% by weight, expressed as sulfur element, preferably of between 2% and 12%, and very preferably of between 4% and 10% by weight, relative to the weight of the at least partially spent catalyst.

Optionally, the at least partially spent catalyst can additionally exhibit a low content of contaminants resulting from the feedstock treated by the fresh catalyst from which it originates, such as silicon, arsenic and metals, such as nickel, vanadium or iron.

Preferably, the content of silicon (besides that possibly present by way of the silica of the support) is less than 2% by weight and very preferably less than 1% by weight, relative to the weight of the at least partially spent catalyst.

Preferably, the content of arsenic is less than 2000 ppm by weight and very preferably less than 1000 ppm by weight, relative to the weight of the at least partially spent catalyst.

Preferably, the content for each of the metals, nickel, vanadium and iron, is less than 1% by weight and very preferably less than 5000 ppm by weight, relative to the weight of the at least partially spent catalyst.

Regeneration (Step a)

The process for the rejuvenation according to the invention of the at least partially spent catalyst comprises a step of removal of the coke and the sulfur (regeneration step).

Specifically, according to step a) of the process according to the invention, the at least partially spent catalyst is regenerated in a stream of oxygen-containing gas at a temperature of between 300° C. and 550° C., so as to obtain a regenerated catalyst.

Even if it is possible, the regeneration is preferably not carried out by keeping the laden catalyst in the hydrotreating reactor (in situ regeneration). Preferably, the at least partially spent catalyst is thus extracted from the reactor and sent to a regeneration plant in order to carry out the regeneration in said plant (ex situ regeneration).

The regeneration step a) is preferably preceded by a deoiling step. The deoiling step generally comprises bringing the at least partially spent catalyst into contact with a stream of inert gas (that is to say essentially devoid of oxygen), for example in a nitrogen atmosphere or the like, at a temperature of between 300° C. and 400° C., preferably of between 300° C. and 350° C. The inert gas flow rate in terms of flow rate per unit volume of the catalyst is from 5 to 150 Nl·l⁻¹·h⁻¹ for 3 to 7 hours.

In an alternative form, the deoiling step can be carried out by way of light hydrocarbons, by steam treatment or any other analogous process.

The deoiling step makes it possible to remove the soluble hydrocarbons which might prove to be dangerous in the regeneration step because they present risks of flammability under an oxidizing atmosphere.

The regeneration step a) is generally carried out in a stream of oxygen-containing gas, generally air. The water content is generally between 0% and 50% by weight. The gas flow rate in terms of flow rate per unit volume of the at least partially spent catalyst is preferably from 20 to 2000 Nl·l⁻¹·h⁻¹, more preferably from 30 to 1000 Nl·l⁻¹·h⁻¹ and particularly preferably from 40 to 500 Nl·l⁻¹·h⁻¹. The duration of the regeneration is preferably 2 hours or more, more preferably 2.5 hours or more and particularly preferably 3 hours or more. The regeneration of the at least partially spent catalyst is generally carried out at a temperature of between 300° C. and 550° C., preferably of between 320° C. and 520° C., with preference of between 400° C. and 510° C., and particularly preferably of between 420° C. and 500° C.

The regenerated catalyst is composed of the oxide support and of the active phase formed of at least one group VIB metal and of at least one group VIII metal and optionally of phosphorus from the fresh catalyst. Following the regeneration, the hydrogenating function (active phase) comprising the group VIB and group VIII metals of the regenerated catalyst is in an oxide form.

The contents of group VIB metal, of group VIII metal and optionally of phosphorus in the regenerated catalyst are generally substantially identical to the contents of the at least partially spent catalyst (disregarding the coke and other impurities in the at least partially spent catalyst) and to the contents of the fresh catalyst from which it results. A slight loss of active phase (generally of less than 10% by weight) may be observed due to the regeneration, which a person skilled in the art can easily determine.

The regenerated catalyst is characterized by a specific surface area of between 5 and 350 m²/g, preferably of between 10 and 300 m²/g, preferably of between 40 and 280 m²/g, very preferably of between 50 and 250 m²/g.

The pore volume of the regenerated catalyst is generally between 0.1 cm³/g and 1.5 cm³/g, preferably between 0.3 cm³/g and 1.1 cm³/g.

The regenerated catalyst obtained in the regeneration step a) contains residual carbon at a content of less than 2% by weight, expressed as carbon element, preferably of between 0.1% and less than 2% by weight, preferentially of between 0.1% and 1% by weight, and particularly preferably of between 0.1% and 0.5% by weight, relative to the weight of the regenerated catalyst. The regenerated catalyst may also not contain residual carbon.

It should be noted that the term "residual carbon" in the present patent application means carbon (coke) remaining in the regenerated catalyst after regeneration of the spent hydrotreating catalyst. This residual carbon content in the regenerated hydrotreating catalyst is measured by elemental analysis according to the standard ASTM D5373.

The regenerated catalyst may contain residual sulfur at a content of less than 5% by weight, preferably of between 0.1% and 3% by weight, preferentially of between 0.1% and 2% by weight, and particularly preferably of between 0.1% and 0.8% by weight, relative to the weight of the regenerated catalyst. The regenerated catalyst may also not contain residual sulfur. This residual sulfur content in the regenerated hydrotreating catalyst is measured by elemental analysis according to ASTM D5373.

Optionally, the regenerated catalyst can additionally exhibit a low content of contaminants resulting from the feedstock treated by the fresh catalyst from which it originates, such as silicon, arsenic and metals, such as nickel, vanadium or iron, in the amounts indicated above.

Rejuvenation (Step b)

The rejuvenation process according to the invention comprises, after regeneration step a), a step b) according to which said regenerated catalyst is brought into contact with an impregnation solution consisting of a mixture of water, at least one precursor of a group VIB metal, at least one precursor of a group VIII metal and at least one organic compound, the content of organic compound introduced into the impregnation solution being between 6% and 21% by weight of organic compound relative to the weight of the regenerated catalyst, the content of group VIB metal introduced into the impregnation solution being between 1% and 5% by weight, expressed as group VIB metal oxide, relative to the weight of the regenerated catalyst, the content of group VIII metal introduced into the impregnation solution being between 0.2% and 1% by weight, expressed as group VIII metal oxide, relative to the weight of the regenerated catalyst, the molar ratio of the organic compound to the sum of the group VIB and group VIII metals present in said solution being between 0.9 and 11 mol/mol.

Step b) of bringing said regenerated catalyst into contact with said impregnation solution can be carried out either by slurry impregnation, or by excess impregnation, or by dry impregnation, or by any other means known to a person skilled in the art.

Equilibrium (or excess) impregnation consists in immersing the support or the catalyst in a volume of solution (often considerably) greater than the pore volume of the support or of the catalyst while keeping the system stirred in order to improve the exchanges between the solution and the support or catalyst. An equilibrium is finally reached after diffusion of the different species into the pores of the support or catalyst. Control of the amount of elements deposited is provided by the prior measurement of an adsorption isotherm which relates the concentration of the elements to be deposited contained in the solution to the amount of the elements deposited on the solid in equilibrium with this solution.

Dry impregnation consists, for its part, in introducing a volume of impregnation solution equal to the pore volume of the support or of the catalyst. Dry impregnation makes it possible to deposit, on a given support or catalyst, all of the metals and additives contained in the impregnation solution.

Step b) can advantageously be carried out by one or more excess impregnations of solution or preferably by one or more dry impregnations and very preferably by a single dry impregnation of said regenerated catalyst, using said impregnation solution.

Said impregnation solution consists of a mixture of water, at least one precursor of a group VIB metal, at least one precursor of a group VIII metal and at least one organic compound.

The group VIB metal introduced is preferentially chosen from molybdenum and tungsten. The group VIII metal introduced is preferentially chosen from cobalt, nickel and the mixture of these two elements. Preferably, the combination of the elements nickel-molybdenum, cobalt-molybdenum, nickel-tungsten, nickel-molybdenum-tungsten and nickel-cobalt-molybdenum is chosen, and very preferably the active phase consists of cobalt and molybdenum, of nickel and molybdenum, of nickel and tungsten or of a nickel-molybdenum-tungsten combination. Particularly preferably, the metals introduced are cobalt and molybdenum.

The group VIB metal introduced and/or the group VIII metal introduced may or may not be identical to the metals already present in the regenerated catalyst. Preferably, they are identical.

Use may be made, by way of example, among the sources of molybdenum, of the oxides and hydroxides, molybdic acids and salts thereof, in particular the ammonium salts, such as ammonium molybdate, ammonium heptamolybdate, phosphomolybdic acid ($H_3PMo_{12}O_{40}$), and salts thereof, and optionally silicomolybdic acid ($H_4SiMo_{12}O_{40}$) and salts thereof. The sources of molybdenum can also be any heteropolycompound of Keggin, lacunary Keggin, substituted Keggin, Dawson, Anderson or Strandberg type, for example. Use is preferably made of molybdenum trioxide and the heteropolycompounds of Keggin, lacunary Keggin, substituted Keggin and Strandberg type.

The tungsten precursors which can be used are also well known to a person skilled in the art. For example, use may be made, among the sources of tungsten, of the oxides and hydroxides, tungstic acids and salts thereof, in particular the ammonium salts, such as ammonium tungstate, ammonium metatungstate, phosphotungstic acid and salts thereof, and optionally silicotungstic acid ($H_4SiW_{12}O_{40}$) and salts thereof. The sources of tungsten can also be any heteropolycompound of Keggin, lacunary Keggin, substituted Keggin or Dawson type, for example. Use is preferably made of the oxides and the ammonium salts, such as ammonium metatungstate, or the heteropolyanions of Keggin, lacunary Keggin or substituted Keggin type.

The cobalt precursors which can be used are advantageously chosen from the oxides, hydroxides, hydroxycarbonates, carbonates and nitrates, for example. Use is preferably made of cobalt hydroxide and cobalt carbonate.

The nickel precursors which can be used are advantageously chosen from the oxides, hydroxides, hydroxycarbonates, carbonates and nitrates, for example. Use is preferably made of nickel hydroxide and nickel hydroxycarbonate.

The content of group VIB metal introduced into the impregnation solution is between 1% and 5% by weight, expressed as group VIB metal oxide, preferably between 1.5% and 4% by weight, and more preferably still between 2% and 3.5% by weight, relative to the weight of the regenerated catalyst.

The molar ratio of the group VIB metal added per group VIB metal already present in the regenerated catalyst is thus between 0.05 and 0.25 mol/mol, preferably between 0.08 and 0.21 mol/mol and more preferably still between 0.11 and 0.18 mol/mol.

The content of group VIII metal introduced into the impregnation solution is between 0.2% and 1% by weight, expressed as group VIII metal oxide, preferably between 0.3% and 0.8% by weight, and more preferably still between 0.4% and 0.7% by weight, relative to the weight of the regenerated catalyst.

The molar ratio of the group VIII metal added per group VIII metal already present in the regenerated catalyst is thus between 0.05 and 0.25 mol/mol, preferably between 0.08 and 0.21 mol/mol and more preferably still between 0.11 and 0.18 mol/mol.

The group VIII metal to group VIB metal molar ratio in the impregnation solution of step b) is generally between 0.1 and 0.5 mol/mol, preferably between 0.15 and 0.48 mol/mol, and particularly preferably between 0.2 and 0.45 mol/mol.

Particularly preferably, the group VIII metal to group VIB metal molar ratio in said solution is identical to the group VIII metal to group VIB metal molar ratio of said regenerated catalyst.

This is because the increase in the catalytic activity is particularly observable when the group VIII metal to group VIB metal molar ratio in the impregnation solution of step b) is between 0.1 and 0.5 mol/mol, and is preferably identical to the ratio of group VIII metal to group VIB metal already present on the regenerated catalyst.

The organic compound introduced into the impregnation solution of step b) is an organic compound containing oxygen and/or nitrogen and/or sulfur. The organic compound is an organic compound that makes it possible to increase the dispersion of the active phase, whether the latter is already present in the regenerated catalyst or introduced via the impregnation solution, thus leading to a more active catalyst.

Generally, the organic compound is chosen from a compound comprising one or more chemical functions chosen from a carboxyl, alcohol, thiol, thioether, sulfone, sulfoxide, ether, aldehyde, ketone, ester, carbonate, amine, nitrile, imide, oxime, urea and amide function, or a compound including a furan ring or also a sugar.

The oxygen-containing organic compound may be one or more chosen from compounds comprising one or more chemical functions chosen from a carboxyl, alcohol, ether, aldehyde, ketone, ester or carbonate function or a compound including a furan ring or also a sugar. An oxygen-containing organic compound is understood here to mean a compound not comprising another heteroatom. By way of example, the oxygen-containing organic compound can be one or more chosen from the group consisting of ethylene glycol, diethylene glycol, triethylene glycol, a polyethylene glycol (with a molecular weight of between 200 and 1500 g/mol), propylene glycol, 2-butoxyethanol, 2-(2-butoxyethoxy)ethanol, 2-(2-methoxyethoxy)ethanol, triethylene glycol dimethyl ether, glycerol, acetophenone, 2,4-pentanedione, pentanone, acetic acid, oxalic acid, maleic acid, malic acid, malonic acid, oxalic acid, gluconic acid, tartaric acid, citric acid, γ-ketovaleric acid, a di($C_1$-$C_4$ alkyl) succinate and more particularly dimethyl succinate, methyl acetoacetate, ethyl acetoacetate, 2-methoxyethyl 3-oxobutanoate, 2-methacryloyloxyethyl 3-oxobutanoate, dibenzofuran, a crown ether, orthophthalic acid, glucose, fructose, sucrose, sorbitol, xylitol, γ-valerolactone, 2-acetylbutyrolactone, propylene carbonate, 2-furaldehyde (also known under the name furfural), 5-hydroxymethylfurfural (also known under the name 5-(hydroxymethyl)-2-furaldehyde or 5-HMF), 2-acetylfuran, 5-methyl-2-furaldehyde, methyl 2-furoate, furfuryl alcohol (also known under the name furfuranol), furfuryl acetate, ascorbic acid, butyl lactate, ethyl lactate, butyl butyryllactate, ethyl 3-hydroxybutanoate, ethyl 3-ethoxypropanoate, methyl 3-methoxypropanoate, 2-ethoxyethyl acetate, 2-butoxyethyl acetate, 2-hydroxyethyl acrylate, 2-hydroxyethyl methacrylate, 1,5-pentanediol, 3-methyl-1,5-pentanediol, 1,5-hexanediol, 3-ethyl-1,5-pentanediol, 2,4-diethyl-1,5-pentanediol, 5-methyl-2(3H)-furanone, butyl glycolate, ethyl 4-oxopentanoate, diethyl maleate, dimethyl maleate, dimethyl fumarate, diethyl fumarate, dimethyl adipate, dimethyl 3-oxoglutarate, dimethyl tartrate, diethyl tartrate, diisopropyl tartrate, di(tert-butyl) tartrate, dimethyl malate, diethyl malate, diisopropyl malate and dibutyl malate.

The nitrogen-containing organic compound can be one or more chosen from compounds comprising one or more chemical functions chosen from an amine or nitrile function. A nitrogen-containing organic compound is understood here to mean a compound not comprising another heteroatom. By way of example, the nitrogen-containing organic compound can be one or more chosen from the group consisting of ethylenediamine, diethylenetriamine, hexamethylenediamine, triethylenetetramine, tetraethylenepentamine, pentaethylenehexamine, acetonitrile, octylamine, guanidine or a carbazole.

The oxygen- and nitrogen-containing organic compound can be one or more chosen from compounds comprising one or more chemical functions chosen from a carboxylic acid, alcohol, ether, aldehyde, ketone, ester, carbonate, amine, nitrile, imide, amide, urea or oxime function. An oxygen- and nitrogen-containing organic compound is understood here to mean a compound not comprising another heteroatom. By way of example, the oxygen- and nitrogen-containing organic compound can be one or more chosen from the group consisting of 1,2-cyclohexanediaminetetraacetic acid, monoethanolamine (MEA), 1-methyl-2-pyrrolidinone, dimethylformamide, ethylenediaminetetraacetic acid (EDTA), alanine, glycine, nitrilotriacetic acid (NTA), N-(2-hydroxyethyl)ethylenediamine-N,N',N'-triacetic acid (HEDTA), diethylenetriaminepentaacetic acid (DTPA), tetramethylurea, glutamic acid, dimethylglyoxime, bicine, tricine, 2-methoxyethyl cyanoacetate, 1-ethyl-2-pyrrolidinone, 1-vinyl-2-pyrrolidinone, 1,3-dimethyl-2-imidazolidinone, 1-(2-hydroxyethyl)-2-pyrrolidinone, 1-(2-hydroxyethyl)-2,5-pyrrolidinedione, 1-methyl-2-piperidinone, 1-acetyl-2-azepanone, 1-vinyl-2-azepanone and 4-aminobutanoic acid.

The sulfur-containing organic compound can be one or more chosen from compounds comprising one or more chemical functions chosen from a thiol, thioether, sulfone or sulfoxide function. By way of example, the sulfur-containing organic compound can be one or more chosen from the group consisting of thioglycolic acid, 2,2'-thiodiethanol, 2-hydroxy-4-methylthiobutanoic acid, a sulfone derivative of a benzothiophene or a sulfoxide derivative of a benzothiophene, ethyl 2-mercaptopropanoate, methyl 3-(methylthio)propanoate and ethyl 3-(methylthio)propanoate.

Preferably, the organic compound contains oxygen; with preference, it is chosen from γ-valerolactone, 2-acetylbutyrolactone, triethylene glycol, diethylene glycol, ethylene glycol, ethylenediaminetetraacetic acid (EDTA), maleic acid, malonic acid, citric acid, acetic acid, oxalic acid, malic acid, gluconic acid, glucose, fructose, sucrose, sorbitol, xylitol, γ-ketovaleric acid, a di($C_1$-$C_4$ alkyl) succinate and more particularly dimethyl succinate, dimethylformamide, 1-methyl-2-pyrrolidinone, propylene carbonate, 2-methoxyethyl 3-oxobutanoate, bicine, tricine, 2-furaldehyde (also known under the name furfural), 5-hydroxymethylfurfural (also known under the name 5-(hydroxymethyl)-2-furaldehyde or 5-HMF), 2-acetylfuran, 5-methyl-2-furaldehyde, ascorbic acid, butyl lactate, ethyl lactate, butyl butyryllactate, ethyl 3-hydroxybutanoate, ethyl 3-ethoxypropanoate, 2-ethoxyethyl acetate, 2-butoxyethyl acetate, 2-hydroxyethyl acrylate, 1-vinyl-2-pyrrolidinone, 1,3-dimethyl-2-imidazolidinone, 1,5-pentanediol, 1-(2-hydroxyethyl)-2-pyrrolidinone, 1-(2-hydroxyethyl)-2,5-pyrrolidinedione, 5-methyl-2(3H)-furanone, 1-methyl-2-piperidinone, 4-aminobutanoic acid, butyl glycolate, ethyl 2-mercaptopropanoate, ethyl 4-oxopentanoate, diethyl maleate, dimethyl maleate, dimethyl fumarate, diethyl fumarate, dimethyl adipate and dimethyl 3-oxoglutarate.

Particularly preferably, the organic compound is chosen from maleic acid, malonic acid, citric acid, acetic acid, oxalic acid, malic acid, gluconic acid, γ-ketovaleric acid, 5-hydroxymethylfurfural (also known under the name 5-(hydroxymethyl)-2-furaldehyde or 5-HMF), fructose and butyl lactate.

It is important for the content of organic compound introduced into the impregnation solution to be between 6% and 21% by weight of organic compound, preferably between 6% and 18% by weight, and particularly preferably between 6% and 16% by weight, relative to the weight of the regenerated catalyst. This is because it is the amount of organic compound, optimized firstly with respect to the metals already present in the regenerated catalyst, and secondly with respect to the amount of group VIB and group VIII metals introduced via the impregnation solution, which makes it possible to observe a catalytic activity of the rejuvenated catalyst that is close to that of the fresh catalyst.

Thus the organic compound is introduced into said impregnation solution of step b) in an amount corresponding to a molar ratio of organic compound in said solution per group VIB metal/metals present in solution of between 1 and 15 mol/mol, preferably of between 1.1 and 10 mol/mol, with preference of between 1.2 and 8 mol/mol and very preferably of between 1.3 and 6 mol/mol.

Similarly, the organic compound is introduced into said impregnation solution of step b) in an amount corresponding to a molar ratio of organic compound in said solution per group VIII metal/metals present in solution of between 3 and 40 mol/mol, preferably of between 3.1 and 25 mol/mol, with preference of between 3.3 and 20 mol/mol and very preferably of between 3.5 and 15 mol/mol.

When multiple organic compounds are present, the molar ratio of all the organic compounds (therefore of the sum of the organic compounds) must satisfy the aforementioned molar ratios.

It is also important for the contents of organic compound and of group VIB and VIII metal to be introduced into the impregnation solution in such a way that the molar ratio of the organic compound to the sum of the group VIB and group VIII metals present in said solution is between 0.9 and 11 mol/mol, preferably between 1 and 4 mol/mol.

This is because it is the introduction of a precise amount of organic compound with respect to the metals already present in the catalyst and with respect to the metals introduced via the impregnation solution which appears to enable a good dissolution and redistribution of the metal phases, in order to recover a dispersion that is close to the fresh catalyst, this being done by adding only a very small amount of metals of the active phase.

Advantageously, after each impregnation step, the impregnated regenerated catalyst is left to mature. Maturation makes it possible for the impregnation solution to disperse homogeneously within the regenerated catalyst.

Any maturation step is advantageously carried out at atmospheric pressure, in a water-saturated atmosphere and at a temperature of between 17° C. and 50° C., and preferably at ambient temperature. Generally, a maturation time of between ten minutes and forty-eight hours, preferably of between thirty minutes and fifteen hours and particularly preferably between thirty minutes and six hours is sufficient.

When several impregnation steps are carried out, each impregnation step is preferably followed by an intermediate drying step at a temperature of less than 200° C., advantageously of between 50° C. and 180° C., preferably between 70° C. and 150° C., very preferably between 75° C. and 130° C., and optionally a maturation period has been observed between the impregnation step and the intermediate drying step.

Drying (Step c)

After the rejuvenation step, the catalyst is subjected to a drying step at a temperature of less than 200° C., advantageously of between 50° C. and 180° C., preferably between 70° C. and 150° C., very preferably between 75° C. and 130° C., without a subsequent calcination step.

The drying step is preferentially carried out under an inert atmosphere or under an oxygen-containing atmosphere.

The drying step may be carried out by any technique known to a person skilled in the art. It is advantageously carried out at atmospheric pressure or at reduced pressure. Preferably, this step is carried out at atmospheric pressure. It is advantageously carried out in a traversed bed using hot air or any other hot gas. Preferably, when the drying is carried out in a fixed bed, the gas used is either air or an inert gas, such as argon or nitrogen. Very preferably, the drying is carried out in a traversed bed in the presence of nitrogen and/or of air. Preferably, the drying step has a duration of between 5 minutes and 4 hours, preferably between 30 minutes and 4 hours and very preferably between 1 hour and 3 hours.

The drying is conducted so as to preferably retain at least 30% by weight of the organic compound introduced during an impregnation step; preferably, this amount is greater than 50% by weight and more preferably still greater than 70% by weight, calculated on the basis of the carbon remaining on the rejuvenated catalyst.

It is important to emphasize that the rejuvenated catalyst does not undergo calcination after the introduction of the metals and of the organic compound during step b) in order to preserve, to the maximum extent, the organic compound in the catalyst. Calcination is understood here to mean a heat treatment under a gas containing air or oxygen at a temperature of greater than or equal to 200° C.

On conclusion of the drying step, a rejuvenated catalyst is then obtained, which catalyst will preferably be subjected to an optional activation (sulfidation) step for its subsequent use in a hydrotreating and/or hydrocracking process.

Rejuvenated Catalyst

The rejuvenated catalyst is composed of the oxide support and of the active phase formed of at least one group VIB metal and of at least one group VIII metal, of the organic compound and optionally of phosphorus.

The total content of group VIII metal (present in the regenerated catalyst and introduced by impregnation during step b) is between 1% and 10.5% by weight, expressed as group VIII metal oxide, relative to the weight of the rejuvenated catalyst, preferably between 1.7% and 9.5% by weight, preferably between 2.2% and 8.5% by weight.

The total content of group VIB metal (present in the regenerated catalyst and introduced by impregnation during step b) is between 5% and 42.5% by weight, expressed as group VIB metal oxide, relative to the weight of the rejuvenated catalyst, preferably between 8% and 38% by weight, very preferably between 11% and 33% by weight, and particularly preferably between 20.8% and 33% by weight.

The group VIII metal to group VIB metal molar ratio of the rejuvenated catalyst is generally between 0.1 and less than 0.5 mol/mol, preferably between 0.15 and 0.48 mol/mol, and particularly preferably between 0.2 and 0.45 mol/mol. Particularly preferably, the group VIII metal to group VIB metal molar ratio of the rejuvenated catalyst is identical to the group VIII metal to group VIB metal molar ratio of said regenerated catalyst.

The content of organic compound on the rejuvenated catalyst is between 6% and 21% by weight, preferably between 6% and 18% by weight and more preferably between 6% and 16% by weight, relative to the weight of the regenerated catalyst.

The total content of phosphorus (possibly already present in the regenerated catalyst) in the rejuvenated catalyst is generally between 0.1% and 20% by weight, expressed as $P_2O_5$, preferably between 0.2% and 15% by weight, very preferably between 0.3% and 11% by weight, relative to the weight of rejuvenated catalyst.

The rejuvenated catalyst is characterized by a specific surface area of between 5 and 350 $m^2/g$, preferably of between 10 and 300 $m^2/g$, preferably of between 40 and 280 $m^2/g$, very preferably of between 50 and 250 $m^2/g$. The pore volume of the rejuvenated catalyst is generally between 0.1 $cm^3/g$ and 1.5 $cm^3/g$, preferably between 0.3 $cm^3/g$ and 1.1 $cm^3/g$.

Sulfidation (Optional Step)

Before its use for the hydrotreating and/or hydrocracking reaction, it is advantageous to transform the rejuvenated catalyst obtained according to the process according to the invention into a sulfided catalyst in order to form its active species. This activation or sulfidation step is carried out by methods well known to a person skilled in the art, and advantageously under a sulfo-reductive atmosphere in the presence of hydrogen and hydrogen sulfide.

On conclusion of step c) of the rejuvenation process according to the invention, said rejuvenated catalyst is thus advantageously subjected to a sulfidation step, without an intermediate calcination step.

Said rejuvenated catalyst is advantageously sulfided ex situ or in situ. The sulfiding agents are $H_2S$ gas, elemental sulfur, $CS_2$, mercaptans, sulfides and/or polysulfides, hydrocarbon cuts having a boiling point of less than 400° C. containing sulfur compounds or any other sulfur-containing compound used for the activation of hydrocarbon feedstocks with a view to sulfiding the catalyst. Said sulfur-containing compounds are advantageously chosen from alkyl disulfides, such as, for example, dimethyl disulfide (DMDS), alkyl sulfides, such as, for example, dimethyl sulfide, thiols, such as, for example, n-butyl mercaptan (or 1-butanethiol), and polysulfide compounds of tert-nonyl polysulfide type. The catalyst can also be sulfided by the sulfur contained in the feedstock to be desulfurized. Preferably, the catalyst is sulfided in situ in the presence of a sulfiding agent and of a hydrocarbon feedstock. Very preferably, the catalyst is sulfided in situ in the presence of a hydrocarbon feedstock additivated with dimethyl disulfide.

Hydrotreating and/or Hydrocracking Process

Lastly, another subject of the invention is the use of the rejuvenated catalyst according to the invention in processes for the hydrotreating and/or hydrocracking of hydrocarbon cuts.

The process for the hydrotreating and/or hydrocracking of hydrocarbon cuts can be carried out in one or more reactors in series of the fixed bed type or of the ebullated bed type.

The process for the hydrotreating and/or hydrocracking of hydrocarbon cuts is carried out in the presence of a rejuvenated catalyst. It may also be carried out in the presence of a mixture of a rejuvenated catalyst and of a fresh catalyst or of a regenerated catalyst.

When the fresh or regenerated catalyst is present, it comprises at least one group VIII metal, at least one group VIB metal and an oxide support, and optionally phosphorus and/or an organic compound such as are described above.

The active phase and the support of the fresh or regenerated catalyst may or may not be identical to the active phase and to the support of the rejuvenated catalyst.

The active phase and the support of the fresh catalyst may or may not be identical to the active phase and to the support of the regenerated catalyst.

When the process for the hydrotreating and/or hydrocracking of hydrocarbon cuts is carried out in the presence of a rejuvenated catalyst and of a fresh or regenerated catalyst, it can be carried out in a reactor of the fixed bed type containing several catalytic beds.

In this case, and according to a first alternative form, a catalytic bed containing the fresh or regenerated catalyst can precede a catalytic bed containing the rejuvenated catalyst in the direction of the circulation of the feedstock.

In this case, and according to a second alternative form, a catalytic bed containing the rejuvenated catalyst can precede a catalytic bed containing the fresh or regenerated catalyst in the direction of the circulation of the feedstock.

In this case, and according to a third alternative form, a catalytic bed can contain a mixture of a rejuvenated catalyst and of a fresh catalyst and/or of a rejuvenated catalyst.

In these cases, the operating conditions are those described below. They are generally identical in the different catalytic beds except for the temperature, which generally increases in a catalytic bed following the exothermicity of the hydrodesulfurization reactions.

When the process for the hydrotreating and/or hydrocracking of hydrocarbon cuts is carried out in the presence of a rejuvenated catalyst and of a fresh or regenerated catalyst in several reactors in series of the fixed bed type or of the ebullated bed type, one reactor can comprise a rejuvenated catalyst while another reactor can comprise a fresh or regenerated catalyst, or a mixture of a rejuvenated catalyst and of a fresh and/or regenerated catalyst, and this can be in any order. It is possible to provide a device for the removal of the H$_2$S from the effluent resulting from the first hydrodesulfurization reactor before treating said effluent in the second hydrodesulfurization reactor. In these cases, the operating conditions are those described below and may or may not be identical in the different reactors.

The rejuvenated catalyst, which has preferably undergone a sulfidation step beforehand, is advantageously used for reactions for the hydrotreating and/or hydrocracking of hydrocarbon feedstocks, such as petroleum cuts, cuts resulting from coal, or hydrocarbons produced from natural gas, optionally as mixtures, or also from a hydrocarbon cut resulting from biomass and more particularly for reactions for the hydrogenation, hydrodenitrogenation, hydrodearomatization, hydrodesulfurization, hydrodeoxygenation, hydrodemetallization or hydroconversion of hydrocarbon feedstocks.

In these uses, the rejuvenated catalyst which has preferably undergone a sulfidation step beforehand exhibits an improved activity in comparison with the catalysts of the prior art. This catalyst can also advantageously be used during the pretreatment of catalytic cracking or hydrocracking feedstocks, or the hydrodesulfurization of residues or the forced hydrodesulfurization of gas oils (ULSD: ultra-low-sulfur diesel).

The feedstocks employed in the hydrotreating process are, for example, gasolines, gas oils, vacuum gas oils, atmospheric residues, vacuum residues, atmospheric distillates, vacuum distillates, heavy fuel oils, oils, waxes and paraffins, spent oils, deasphalted residues or crudes, feedstocks originating from thermal or catalytic conversion processes, lignocellulosic feedstocks or, more generally, feedstocks resulting from biomass, taken alone or as a mixture. The feedstocks which are treated, and in particular those mentioned above, generally contain heteroatoms, such as sulfur, oxygen and nitrogen, and, for heavy feedstocks, they usually also contain metals.

The operating conditions used in the processes implementing the reactions for the hydrotreating of hydrocarbon feedstocks described above are generally as follows: the temperature is advantageously between 180° C. and 450° C. and preferably between 250° C. and 440° C., the pressure is advantageously between 0.5 and 30 MPa and preferably between 1 and 18 MPa, the hourly space velocity is advantageously between 0.1 and 20 h$^{-1}$ and preferably between 0.2 and 5 h$^{-1}$, and the hydrogen/feedstock ratio, expressed as volume of hydrogen, measured under standard temperature and pressure conditions, per volume of liquid feedstock, is advantageously between 50 and 5000 l/l and preferably 80 and 2000 l/l.

According to a first mode of use, said hydrotreating process is a process for the hydrotreating, and in particular for the hydrodesulfurization (HDS), of a gas oil cut carried out in the presence of at least one rejuvenated catalyst according to the invention. Said hydrotreating process is targeted at removing the sulfur-based compounds present in said gas oil cut so as to meet the environmental standards in force, namely a permitted sulfur content of up to 10 ppm by weight. It also makes it possible to reduce the contents of aromatics and of nitrogen of the gas oil cut to be hydrotreated.

Said gas oil cut to be hydrotreated generally contains from 0.02% to 5.0% by weight of sulfur. It advantageously results from direct distillation (or straight-run gas oil), from a coking unit, from a visbreaking unit, from a steam cracking unit, from a unit for the hydrotreating and/or hydrocracking of heavier feedstocks and/or from a catalytic cracking unit (fluid catalytic cracking). Said gas oil cut preferentially has at least 90% of compounds with a boiling point of between 250° C. and 400° C. at atmospheric pressure (ASTM D2887).

The process for the hydrotreating of said gas oil cut is carried out under the following operating conditions: a temperature of between 200° C. and 400° C., preferentially between 300° C. and 380° C., a total pressure of between 2 MPa and 10 MPa and more preferentially between 3 MPa and 8 MPa, with a ratio of the volume of hydrogen per volume of hydrocarbon feedstock, expressed as volume of hydrogen, measured under standard temperature and pressure conditions, per volume of liquid feedstock, of between 100 and 600 l/l and more preferentially between 200 and 400 l/l, and an hourly space velocity (HSV) of between 0.5 and 10 h$^{-1}$, preferentially between 0.7 and 8 h$^{-1}$. The HSV corresponds to the inverse of the contact time expressed in hours and is defined by the ratio of the flow rate by volume of liquid hydrocarbon feedstock per volume of catalyst charged to the reaction unit implementing the hydrotreating process according to the invention. The reaction unit implementing the process for the hydrotreating of said gas oil cut is preferentially operated as a fixed bed, as a moving bed or as an ebullated bed, preferably as a fixed bed.

According to a second mode of use, said hydrotreating and/or hydrocracking process is a process for the hydrotreating (in particular hydrodesulfurization, hydrodenitrogenation, hydrogenation of aromatics) and/or hydrocracking of a vacuum distillate cut carried out in the presence of at least one rejuvenated catalyst according to the invention. Said hydrotreating and/or hydrocracking process, otherwise known as hydrocracking pretreatment or hydrocracking process, is targeted, as the case may be, at removing the sulfur-based, nitrogen-based or aromatic compounds present in said distillate cut so as to carry out a pretreatment before conversion in catalytic cracking or hydroconversion processes, or at hydrocracking the distillate cut which would optionally have been pretreated beforehand, if necessary.

Highly varied feedstocks can be treated by the processes for the hydrotreating and/or hydrocracking of vacuum distillates described above. Generally, they contain at least 20% by volume and often at least 80% by volume of compounds boiling above 340° C. at atmospheric pressure (ASTM D6352). The feedstock may, for example, be vacuum distillates and also feedstocks originating from units for the extraction of aromatics from lubricant oil bases or resulting from the solvent dewaxing of lubricant oil bases, and/or deasphalted oils, or the feedstock may be a deasphalted oil or paraffins resulting from the Fischer-Tropsch process, or any mixture of the feedstocks mentioned above. In general, the feedstocks have a T5 boiling point of greater than 340° C. at atmospheric pressure and better still of greater than 370° C. at atmospheric pressure, that is to say that 95% of the compounds present in the feedstock have a boiling point of greater than 340° C. and better still of greater than 370° C. The nitrogen content of the feedstocks treated in the processes according to the invention is usually greater than 200 ppm by weight, preferably between 500 and 10 000 ppm by weight. The sulfur content of the feedstocks treated in the processes according to the invention is usually between 0.01% and 5.0% by weight. The feedstock may optionally contain metals (for example nickel and vanadium). The content of asphaltenes is generally less than 3000 ppm by weight.

The rejuvenated catalyst is generally brought into contact, in the presence of hydrogen, with the feedstocks described above, at a temperature of greater than 200° C., often of between 250° C. and 480° C., advantageously of between 320° C. and 450° C., preferably between 330° C. and 435° C., under a pressure of greater than 1 MPa, often of between 2 and 25 MPa, preferably between 3 and 20 MPa, the space velocity being between 0.1 and 20.0 h$^{-1}$ and preferably 0.1-6.0 h$^{-1}$, preferably 0.2-3.0 h$^{-1}$, and the amount of hydrogen introduced is such that the liter of hydrogen/liter of hydrocarbon ratio by volume, expressed as volume of hydrogen, measured under standard temperature and pressure conditions, per volume of liquid feedstock, is between 80 and 5000 l/l and usually between 100 and 2000 l/l. These operating conditions used in the processes according to the invention generally make it possible to obtain conversions per pass, into products having boiling points of less than 340° C. at atmospheric pressure and better still of less than 370° C. at atmospheric pressure, of greater than 15% and more preferably still of between 20% and 95%.

The processes for the hydrotreating and/or hydrocracking of vacuum distillates employing the rejuvenated catalysts according to the invention cover the pressure and conversion ranges extending from mild hydrocracking to high-pressure hydrocracking. Mild hydrocracking is understood to mean a hydrocracking which results in moderate conversions, generally of less than 40%, and which operates at low pressure, generally between 2 MPa and 6 MPa.

The rejuvenated catalyst according to the invention can be used alone, in a single or in several fixed bed catalytic beds, in one or more reactors, in a "one-step" hydrocracking scheme, with or without liquid recycling of the unconverted fraction, or alternatively in a "two-step" hydrocracking scheme, optionally in combination with a hydrorefining catalyst located upstream of the rejuvenated catalyst.

According to a third mode of use, said hydrotreating and/or hydrocracking process is advantageously implemented as pretreatment in a fluidized bed catalytic cracking (or FCC: Fluid Catalytic Cracking) process. The operating conditions of the pretreatment in terms of range of temperature, pressure, hydrogen recycling rate and hourly space velocity are generally identical to those described above for the processes for the hydrotreating and/or hydrocracking of vacuum distillates. The FCC process can be carried out in a conventional manner known to a person skilled in the art under suitable cracking conditions for the purpose of producing hydrocarbon products of lower molecular weight. A summary description of catalytic cracking will be found, for example, in Ullmann's Encyclopedia of Industrial Chemistry, Volume A18, 1991, pages 61 to 64.

According to a fourth mode of use, said hydrotreating and/or hydrocracking process according to the invention is a process for the hydrotreating (in particular hydrodesulfurization) of a gasoline cut in the presence of at least one rejuvenated catalyst according to the invention.

Unlike other hydrotreating processes, the hydrotreating (in particular the hydrodesulfurization) of gasolines has to make it possible to respond to a twofold conflicting constraint: to provide deep hydrodesulfurization of gasolines and to limit the hydrogenation of the unsaturated compounds present in order to limit the loss in octane number.

The feedstock is generally a hydrocarbon cut having a distillation range of between 30° C. and 260° C. Preferably, this hydrocarbon cut is a cut of the gasoline type. Very preferably, the gasoline cut is an olefinic gasoline cut resulting, for example, from a catalytic cracking (Fluid Catalytic Cracking) unit.

The hydrotreating process consists in bringing the hydrocarbon cut into contact with the rejuvenated catalyst and hydrogen under the following conditions: at a temperature of between 200° C. and 400° C., preferably of between 230° C. and 330° C., at a total pressure of between 1 and 3 MPa, preferably of between 1.5 and 2.5 MPa, at an hourly space velocity (HSV), defined as being the flow rate by volume of feedstock with respect to the volume of catalyst, of between 1 and 10 h$^{-1}$, preferably of between 2 and 6 h$^{-1}$, and at a hydrogen/gasoline feedstock ratio by volume of between 100 and 600 Nl/l, preferably of between 200 and 400 Nl/l.

The process for the hydrotreating of the gasolines can be carried out in one or more reactors in series of the fixed bed type or of the ebullated bed type. If the process is carried out by means of at least two reactors in series, it is possible to provide a device for the removal of the H$_2$S from the effluent resulting from the first hydrodesulfurization reactor before treating said effluent in the second hydrodesulfurization reactor.

The following examples demonstrate the significant gain in activity, with respect to the regenerated catalyst, of the rejuvenated catalysts prepared according to the process according to the invention.

EXAMPLES

Example 1: Obtaining the Regenerated Catalyst C1

A hydrotreating catalyst was used in a refinery for 2 years on a unit for the hydrodesulfurization of gas oil. The spent catalyst contains cobalt, molybdenum, and phosphorus, the contents of which as oxide equivalents are 4.1% CoO, 20.5% $MoO_3$ and 5.6% $P_2O_5$, (disregarding carbon and sulfur) supported on a gamma alumina and 13% by weight of carbon and 8.5% of sulfur. After a deoiling step, the catalyst undergoes a regeneration under an oxidizing atmosphere at 500° C. The regenerated catalyst C1 is obtained, containing the same contents of cobalt, molybdenum and phosphorus. The Co/Mo molar ratio in the regenerated catalyst is thus 0.38 mol/mol. The water retention volume of the catalyst C1 is 0.4 ml/g.

Example 2: Preparation of the Catalyst C2 in Accordance with the Invention

The catalyst C2 is prepared from the regenerated catalyst C1 on which an aqueous solution containing malic acid, cobalt hydroxide and molybdenum oxide is dry impregnated, so as to obtain molar ratios of metals added with respect to the regenerated catalyst of 0.13 both for cobalt and molybdenum and the molar ratio of malic acid added/(Mo+ Co) in solution of 3.4, i.e. 2.7% by weight of $MoO_3$ added, 0.5% by weight of CoO added and 12% by weight of malic acid added with respect to the regenerated catalyst. The Co/Mo ratio in the impregnation solution is 0.38 mol/mol and the Co/Mo ratio on the rejuvenated catalyst is also 0.38 mol/mol. After a maturation of 3 h, the catalyst is dried at 120° C. for 2 h.

Example 3: Preparation of the Catalyst C3 not in Accordance with the Invention

Catalyst C3 is obtained by calcining catalyst C2 of example 2 under air at 500° C. for 2 hours.

Example 4: Preparation of the Catalyst C4 not in Accordance with the Invention

Catalyst C4 is prepared from the regenerated catalyst C1 on which an aqueous solution containing only malic acid is dry impregnated, so as to add 12% by weight of malic acid with respect to the regenerated catalyst. After a maturation of 3 h, the catalyst is dried at 120° C. for 2 h.

Example 5: Preparation of the Catalyst C5 not in Accordance with the Invention

The catalyst C5 is prepared from the regenerated catalyst C1 on which an aqueous solution containing cobalt nitrate and ammonium heptamolybdate is dry impregnated, so as to obtain molar ratios of metals added with respect to the regenerated catalyst of 0.13 both for cobalt and molybdenum, i.e. 2.7% by weight of $MoO_3$ added and 0.5% by weight of CoO added with respect to the regenerated catalyst. After a maturation of 3 h, the catalyst is dried at 120° C. for 2 h.

Example 6: Preparation of the Catalyst C6 not in Accordance with the Invention

The catalyst C6 is prepared from the regenerated catalyst C1 on which an aqueous solution containing malic acid, cobalt hydroxide and molybdenum oxide is dry impregnated, so as to obtain molar ratios of metals added with respect to the regenerated catalyst of 0.13 both for cobalt and molybdenum and the molar ratio of malic acid added/(Mo+ Co) in solution of 0.9, i.e. 2.7% by weight of $MoO_3$ added, 0.5% by weight of CoO added and 3% by weight of malic acid added with respect to the regenerated catalyst. After a maturation of 3 h, the catalyst is dried at 120° C. for 2 h.

Example 7: Preparation of the Catalyst C7 not in Accordance with the Invention

The catalyst C7 is prepared from the regenerated catalyst C1 on which an aqueous solution containing malic acid, cobalt hydroxide and molybdenum oxide is dry impregnated, so as to obtain molar ratios of metals added with respect to the regenerated catalyst of 0.03 both for cobalt and molybdenum and the molar ratio of malic acid added/(Mo+ Co) in solution of 17.6, i.e. 0.5% by weight of $MoO_3$ added, 0.1% by weight of CoO added and 12% of malic acid added with respect to the regenerated catalyst. After a maturation of 3 h, the catalyst is dried at 120° C. for 2 h.

Example 8: Preparation of the Catalyst C8 not in Accordance with the Invention

The catalyst C8 is prepared from the regenerated catalyst C1 on which an aqueous solution containing malic acid, cobalt hydroxide and molybdenum oxide is dry impregnated, so as to obtain molar ratios of metals added with respect to the regenerated catalyst of 0.76 and 0.13 for cobalt and molybdenum, respectively, and the molar ratio of malic acid added/(Mo+Co) in solution of 1.5, i.e. 2.7% by weight of $MoO_3$ added, 3.1% by weight of CoO added and 12% of malic acid added with respect to the regenerated catalyst. The Co/Mo ratio in the impregnation solution is 2.3 and the Co/Mo ratio on the rejuvenated catalyst is 0.6. After a maturation of 3 h, the catalyst is dried at 120° C. for 2 h.

Example 9: Preparation of the Catalyst C9 in Accordance with the Invention

The catalyst C9 is prepared from the regenerated catalyst C1 on which an aqueous solution containing malic acid, cobalt hydroxide and molybdenum oxide is dry impregnated, so as to obtain molar ratios of metals added with respect to the regenerated catalyst of 0.03 and 0.13 for cobalt and molybdenum, respectively, and the molar ratio of malic acid added/(Mo+Co) in solution of 4.3, i.e. 2.7% by weight of $MoO_3$ added, 0.13% by weight of CoO added and 12% of malic acid added with respect to the regenerated catalyst. The Co/Mo ratio in the impregnation solution is 0.1 and the Co/Mo ratio on the catalyst is 0.35. After a maturation of 3 h, the catalyst is dried at 120° C. for 2 h.

Example 10: Evaluation in the Hydrodesulfurization (HDS) of Gas Oil of the Catalysts C2 and C9 (in Accordance with the Invention) and C3 to C8 (not in Accordance with the Invention)

Catalysts C2 and C9 (in accordance with the invention) and C3 to C8 (not in accordance with the invention) were catalyst volume of 30 cm³, a temperature of from 330° C. to 360° C., with a hydrogen flow rate of 24 I/h and with a feedstock flow rate of 60 cm³/h.

The catalytic performance qualities of the catalysts tested are given in table 1. They are expressed in degrees Celsius with respect to the regenerated catalyst C1 chosen as reference: they correspond to the temperature difference to be applied in order to achieve 50 ppm of sulfur in the effluent. A negative value means that the target sulfur content is attained for a lower temperature and that there is therefore a gain in activity.

TABLE 1

| Catalyst | Rejuvenation solution, Heat Treatment | Addition of metals (% by weight) added with respect to the regenerated catalyst and Co/Mo ratio in the rejuvenation solution | Addition of MA* (% by weight) with respect to the regenerated catalyst | Delta T(° C.)/ regenerated |
|---|---|---|---|---|
| Reference C1 | — (regenerated) | — | — | 0.0 |
| Invention C2 | CoMo + AM Dried | +2.7% by weight MoO₃, Co/Mo 0.38 | 12% by weight | −8.9 |
| Comparative C3 | CoMo + AM Calcined | +2.7% by weight MoO₃, Co/Mo 0.38 | 12% by weight | −2.7 |
| Comparative C4 | MA alone Dried | — | 12% by weight | −5.8 |
| Comparative C5 | CoMo alone Dried | +2.7% by weight MoO₃, Co/Mo 0.38 | — | −1.8 |
| Comparative C6 | CoMo + AM low MA content dried | +2.7% by weight MoO₃, Co/Mo 0.38 | 3% by weight | −3.1 |
| Comparative C7 | CoMo + AM low metal contents dried | +0.5% by weight MoO₃, Co/Mo 0.38 | 12% by weight | −6.8 |
| Comparative C8 | CoMo + AM with Co/ Mo $_{solution}$ > 0.5 dried | +2.7% by weight MoO₃, Co/Mo 2.1 | 12% by weight | −6.1 |
| Invention C9 | CoMo + AM Co/Mo $_{solution}$ ≠ Co/Mo $_{regenerated\ catalyst}$ Dried | +2.7% by weight MoO₃, Co/Mo 0.1 | 12% by weight | −8.3 |

*MA = malic acid tested in the hydrodesulfurization of gas oil. The regenerated catalyst C1 was also tested and serves as reference.

The characteristics of the gas oil feedstock used are as follows: density at 15° C.=0.8522 g/cm³, sulfur content=1.44% by weight.

Simulated distillation (ASTM D2887):

IP: 155° C.

10%: 247° C.

50%: 315° C.

90%: 392° C.

FP: 444° C.

The test is carried out in an isothermal pilot reactor having a traversed fixed bed, the fluids circulating from the bottom upward.

The catalysts are sulfided beforehand in situ at 350° C. in the reactor under pressure by means of the gas oil of the test to which 2% by weight of dimethyl disulfide is added.

The hydrodesulfurization tests were performed under the following operating conditions: a total pressure of 7 MPa, a The catalyst C2 (according to the invention) has improved activity compared to a catalyst that has been simply regenerated (catalyst C1) or a catalyst that has been rejuvenated with a solution according to the invention but that has been calcined after rejuvenation (catalyst C3).

The catalyst C2 (according to the invention) also exhibits improved activity compared to a catalyst containing only the metals or the organic compound in the impregnation solution (catalysts C4 and C5).

The comparison of the activities of the catalysts C6 and C7 (not in accordance) with that of the catalyst C2 (according to the invention) shows that the optimization of the amount of organic compound introduced into the regenerated catalyst as well as the optimization of the amount of group VIB and group VIII metals introduced make it possible to observe an increase in catalytic activity.

The comparison of the activity of the catalyst C9 (according to the invention) with that of the catalyst C2 (according to the invention) shows that this increase is particularly visible when the group VIII metal to group VIB metal molar ratio in the impregnation solution is identical to the ratio of group VIII metal to group VIB metal that are already present on the regenerated catalyst (Co/Mo ratio=0.38 mol/mol in both cases for the catalyst C2).

The invention claimed is:

1. A process for rejuvenating an at least partially spent hydrotreating and/or hydrocracking catalyst, said at least partially spent catalyst comprising at least one group VIB metal, at least one group VIII metal, an oxide support, and optionally phosphorus, the at least partially spent catalyst having a content of group VIB metal of between 1% and 40% by weight, expressed as oxide of said group VIB metal, relative to the weight of the catalyst, and a content of group VIII metal of between 1% and 10% by weight, expressed as oxide of said group VIII metal, relative to the weight of the catalyst, said process comprising the following steps:

a) the at least partially spent catalyst is regenerated in a stream of oxygen-containing gas at a temperature of between 300° C. and 550° C., so as to obtain a regenerated catalyst, b) said regenerated catalyst is then brought into contact with an impregnation solution consisting of a mixture of water, at least one precursor of a group VIB metal, at least one precursor of a group VIII metal and at least one organic compound, the content of organic compound introduced into the impregnation solution being between 6% and 21% by weight of organic compound relative to the weight of the regenerated catalyst, the content of group VIB metal introduced into the impregnation solution being between 1% and 5% by weight, expressed as group VIB metal oxide, relative to the weight of the regenerated catalyst, the content of group VIII metal introduced into the impregnation solution being between 0.2% and 1% by weight, expressed as group VIII metal oxide, relative to the weight of the regenerated catalyst, the molar ratio of the organic compound to the sum of the group VIB and group VIII metals present in said solution being between 0.9 and 11 mol/mol, c) a drying step is then carried out at a temperature of less than 200° C., without subsequently calcining it, so as to obtain a rejuvenated catalyst.

2. The process as claimed in claim 1, wherein the group VIII metal to group VIB metal molar ratio in the impregnation solution of step b) is between 0.1 and 0.5 mol/mol.

3. The process as claimed in claim 1, wherein the group VIII metal to group VIB metal molar ratio of the regenerated catalyst is between 0.1 and 0.5 mol/mol.

4. The process as claimed in claim 1, wherein the group VIII metal to group VIB metal molar ratio in the impregnation solution of step b) is identical to the group VIII metal to group VIB metal molar ratio of the regenerated catalyst.

5. The process as claimed in claim 1, wherein the content of organic compound introduced into the impregnation solution is between 6% and 16% by weight of organic compound relative to the weight of the regenerated catalyst.

6. The process as claimed in claim 1, wherein the molar ratio of the organic compound to the sum of the group VIB and group VIII metals present in said solution is between 1 and 4 mol/mol.

7. The process as claimed in claim 1, wherein the organic compound is chosen from an organic compound containing oxygen and/or nitrogen and/or sulfur.

8. The process as claimed in claim 7, wherein the organic compound is chosen from a compound comprising one or more chemical functions chosen from a carboxyl, alcohol, thiol, thioether, sulfone, sulfoxide, ether, aldehyde, ketone, ester, carbonate, amine, nitrile, imide, oxime, urea and amide function, or a compound including a furan ring or also a sugar.

9. The process as claimed in claim 8, wherein the organic compound is chosen from γ-valerolactone, 2-acetylbutyrolactone, triethylene glycol, diethylene glycol, ethylene glycol, ethylenediaminetetraacetic acid (EDTA), maleic acid, malonic acid, citric acid, acetic acid, oxalic acid, malic acid, gluconic acid, glucose, fructose, sucrose, sorbitol, xylitol, γ-ketovaleric acid, a di(C$_1$-C$_4$ alkyl) succinate, dimethyl succinate, dimethylformamide, 1-methyl-2-pyrrolidinone, propylene carbonate, 2-methoxyethyl 3-oxobutanoate, bicine, tricine, 2-furaldehyde, 5-hydroxymethylfurfural, 2-acetylfuran, 5-methyl-2-furaldehyde, ascorbic acid, butyl lactate, ethyl lactate, butyl butyryllactate, ethyl 3-hydroxybutanoate, ethyl 3-ethoxypropanoate, 2-ethoxyethyl acetate, 2-butoxyethyl acetate, 2-hydroxyethyl acrylate, 1-vinyl-2-pyrrolidinone, 1,3-dimethyl-2-imidazolidinone, 1,5-pentanediol, 1-(2-hydroxyethyl)-2-pyrrolidinone, 1-(2-hydroxyethyl)-2,5-pyrrolidinedione, 5-methyl-2 (3H)-furanone, 1-methyl-2-piperidinone, 4-aminobutanoic acid, butyl glycolate, ethyl 2-mercaptopropanoate, ethyl 4-oxopentanoate, diethyl maleate, dimethyl maleate, dimethyl fumarate, diethyl fumarate, dimethyl adipate, and dimethyl 3-oxoglutarate.

10. The process as claimed in claim 1, wherein the at least partially spent catalyst contains phosphorus, the total content of phosphorus being between 0.1% and 20% by weight, expressed as P$_2$O$_5$, relative to the weight of the catalyst.

11. The process as claimed in claim 1, wherein the oxide support is chosen from aluminas, silica, silica-aluminas or also titanium or magnesium oxides, used alone or as a mixture with alumina or silica-alumina.

12. The process as claimed in claim 1, wherein the regeneration step is preceded by a deoiling step which comprises bringing an at least partially spent catalyst resulting from a hydrotreating and/or hydrocracking process into contact with a stream of inert gas at a temperature of between 300° C. and 400° C.

13. The process as claimed in claim 1, wherein the rejuvenated catalyst is subjected to sulfidation after step c).

14. A process for the hydrotreating and/or hydrocracking of hydrocarbon cuts comprising bringing a hydrocarbon cut into contact with catalyst obtained according to the process as claimed in claim 1.

* * * * *